United States Patent
Walls

(10) Patent No.: US 9,471,443 B2
(45) Date of Patent: *Oct. 18, 2016

(54) USING THE SHORT STROKED PORTION OF HARD DISK DRIVES FOR A MIRRORED COPY OF SOLID STATE DRIVES

(71) Applicant: International Business Machines Corporation, Armonk, NY (US)

(72) Inventor: Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,633

(22) Filed: Jul. 27, 2015

(65) Prior Publication Data

US 2016/0026544 A1 Jan. 28, 2016

Related U.S. Application Data

(63) Continuation of application No. 14/326,948, filed on Jul. 9, 2014, now Pat. No. 9,122,408, which is a continuation of application No. 13/795,017, filed on Mar. 12, 2013, now Pat. No. 8,819,333, which is a continuation of application No. 13/079,247, filed on Apr. 4, 2011, now abandoned.

(51) Int. Cl.
| | |
|---|---|
| *G06F 12/00* | (2006.01) |
| *G06F 11/14* | (2006.01) |
| *G06F 11/20* | (2006.01) |
| *G06F 3/06* | (2006.01) |
| *G06F 12/02* | (2006.01) |

(52) U.S. Cl.
CPC ........... *G06F 11/1464* (2013.01); *G06F 3/065* (2013.01); *G06F 3/0619* (2013.01); *G06F 3/0647* (2013.01); *G06F 3/0688* (2013.01); *G06F 11/2087* (2013.01); *G06F 3/0601* (2013.01); *G06F 3/067* (2013.01); *G06F 12/0246* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,318,118 | B2 | 1/2008 | Chu et al. |
| 7,555,575 | B2 | 6/2009 | Kaneda |
| 7,613,876 | B2 | 11/2009 | Bruce et al. |
| 8,082,389 | B2 | 12/2011 | Fujibayashi et al. |
| 8,819,333 | B2 | 8/2014 | Walls |
| 2009/0240881 | A1 | 9/2009 | Halloush et al. |
| 2010/0079885 | A1 | 4/2010 | McKean |
| 2010/0169571 | A1 | 7/2010 | Kamalavannan et al. |
| 2010/0274965 | A1 | 10/2010 | Cleveland et al. |
| 2012/0254508 | A1 | 10/2012 | Walls |
| 2013/0191607 | A1 | 7/2013 | Walls |
| 2014/0325128 | A1 | 10/2014 | Walls |

OTHER PUBLICATIONS

U.S. Appl. No. 13/079,247.
(Continued)

*Primary Examiner* — Brian Peugh
(74) *Attorney, Agent, or Firm* — Stephen J. Walder, Jr.; Randall J. Bluestone

(57) ABSTRACT

Mechanisms for storing data to a storage system comprising a set of one or more solid state storage devices and a set of non-solid state storage devices are provided. A request to write data to the storage system is received and the data is written to the set of one or more solid state storage devices in response to receiving the request. Moreover, a mirror copy of the data is written to the set of non-solid state storage devices in response to receiving the request. Thus, the non-solid state storage devices serve as a mirror backup copy of the data stored to the solid state storage devices.

22 Claims, 5 Drawing Sheets

(56) References Cited

OTHER PUBLICATIONS

U.S. Appl. No. 13/795,017.
U.S. Appl. No. 14/326,948.
Mao, Bo et al., "HPDA: A Hybrid Parity-based Disk Array for Enhanced Performance and Reliability", 2010 IEEE Int'l. Symp. on Parallel and Distributed Processing (IPDPS), Atlanta, GA, current version May 24, 2010, 12 pages.
Siewert, Sam et al., "Solid State Drive Applications in Storage and Embedded Systems", Intel Technology Journal, vol. 13, Issue 1, 2009, pp. 29-53.

USING THE SHORT STROKED PORTION OF HARD DISK DRIVES FOR A MIRRORED COPY OF SOLID STATE DRIVES

This application is a continuation of application Ser. No. 14/326,948, filed Jul. 9, 2014, status awaiting publication.

BACKGROUND

The present application relates generally to an improved data processing apparatus and method and more specifically to mechanisms for using the short stroked portion of hard disk drives for a mirrored copy of solid state drives.

A solid state drive (SSD) is a data storage device that uses solid-state memory to store persistent data. SSDs use microchips which can retain data that persists even when power is removed to the media. As such, SSDs do not contain any moving parts. Hard disk drives (HDDs), on the other hand, are electromechanical devices containing spinning disks and movable read/write heads.

SSDs are less susceptible to physical shock than HDDs and are quieter than HDDs due to the lack of moving parts in SSDs. Moreover, SSDs have lower access time and latency since there is no seek time or rotational delay associated with SSDs. That is, with HDDs, in order to read or write data in a particular place on the disk, the read/write head of the disk needs to be physically moved to the correct place on the spinning platter. This process is known as seeking and the time it takes for the read/write head to move to the correct place is referred to as the seek time. Seek time for a given disk varies depending on how far the read/write head's destination is from its origin at the time of each read or write instruction and the rate at which the disk is spinning and thus, seek time is often referred to as the average seek time.

SSDs do not have such a seek time because data is accessed without use of moving parts. However, with SSDs there is some delay from hardware signal relay and buffering that is sometimes described as a "seek time" but it is not the traditional seek time associated with HDDs. With SSDs built from NAND Flash memory, the cells are still read a sector at a time which induces some access delay. For writes, an entire erase block must be erased and then reprogrammed by pumping charge into some or all of the floating gate cells. This delay can be significant, but SSDs deploying NAND Flash can have dozens of chips and therefore have many writes or reads or a mixture going in parallel.

Rotational delay is the time required for the addressed area of the HDD to rotate into a position where it is accessible by the read/write head. Again, SSDs do not have a rotational delay because they do not include rotating disks. Thus, SSDs do not suffer from the same delays or latency associated with HDDs and can provide a much faster data access capability than traditional HDDs.

Many SSDs use the same interface as HDDs and thus, can be used to easily replace HDDs in most applications. As of 2010, most SSDs use NAND-based flash memory which retains the data in memory even without power. Other SSDs are also known that use volatile random-access memory (RAM). These RAM based SSDs are used in situations where fast access to data is desired but the data does not necessarily need to be persisted after power loss, or in situations where some alternate power source like batteries are used to maintain data after power from a central power supply is discontinued.

While SSDs provide a much faster data access speed than traditional HDDs, SSDs tend to be more costly than HDDs. Thus, while SSDs can be used to replace HDDs, the high relative cost of SSDs often makes the complete replacement of all HDDs with SSDs cost prohibitive.

SUMMARY

In one illustrative embodiment, a method, in a data processing system, is provided for storing data to a storage system comprising a set of one or more solid state storage devices and a set of non-solid state storage devices. The method comprises receiving a request to write data to the storage system. The method further comprises writing the data to the set of one or more solid state storage devices in response to receiving the request. Moreover, the method comprises writing a mirror copy of the data to the set of non-solid state storage devices in response to receiving the request.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

Furthermore, in other illustrative embodiments, a system is provided that comprises a set of one or more solid state storage devices and a set of non-solid state storage devices. A controller is coupled to these sets of devices and operates to receive a write data request, write the data to the set of one or more solid state storage devices in response to receiving the request, and write a mirror copy of the data to the non-solid state storage devices in response to receiving the request.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
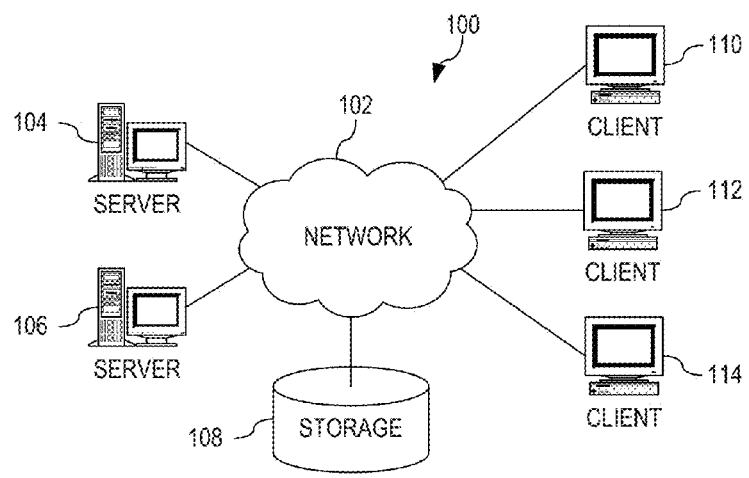
FIG. 1 is an example diagram of a distributed data processing system in which aspects of the illustrative embodiments may be implemented.

As mentioned above, solid state drives, while providing higher access rates for accessing stored data, represent a significant cost increase with regard to storage systems. While the cost of solid state drives may be decreasing, they are still significantly more expensive than traditional hard disk drives and the delta will likely remain so for the foreseeable future. However, since the performance of SSDs can be as much as 100 times more than traditional hard disk drives, system designers are compelled to use them in storage and server systems to increase the value of the storage or server systems to clients. Since critical data may be stored in these SSDs, it is very important to have some type of redundancy built into the system, e.g., RAID 5 or RAID 10, for example. However, these redundancy mechanisms require additional SSDs to provide the redundancy which increases the cost of using SSDs.

The illustrative embodiments provide a mechanism for using the short stroked portion of hard disk drives (HDDs) as the mirrored copy for solid state drives (SSDs). Short stroking is the use of a small band of cylinders at the outside area of the disk. Since the circumference of the circle of the disk is larger on the outer diameter, the read/write head of the HDD does not have to be moved as often in order to store and/or retrieve data. In addition, keeping the band of cylinders small through short stroking means that the seek time for random operations is reduced since the distance is small. This is referred to as short stroking, and the small band of cylinders at the outside area is referred to as the short stroked portion, because the stroke of the read/write head arm's movement is kept as short as possible.

In particular, the mechanisms of the illustrative embodiments have a first set of SSDs which are used as the primary drives for data storage of frequently accessed data in a storage system of a data processing system. In one example embodiment, the SSDs may be provided at tier 0 of a multi-tiered storage system.

A plurality of HDDs are provided as secondary drives of the storage system and are used to store less frequently accessed data. For example, in one illustrative embodiment, the HDDs are provided as tier 1 storage devices and/or lower tier storage devices of the storage system. In addition to providing storage capacity for less frequently accessed data, in accordance with mechanisms of the illustrative embodiments, a portion of each HDD is reserved for storage of a mirror copy of data on the SSDs. That is, a mirror copy of the data stored in the SSDs is striped across the reserved portions of the HDDs. The portion of each HDD that is reserved for a mirror copy of the SSDs is a portion of the HDD that has an access rate that, when aggregated with the access rates of the reserved portions of the other HDDs, matches that of the SSDs.

In one illustrative embodiment, this portion is a short stroked portion of the HDD. As mentioned above, short stroking is a process of limiting the number of tracks used per HDD to only the outer sectors of the platters (or disks) of the HDD which provide the best performance by minimizing head repositioning delays. In the illustrative embodiments, this aggregate short stroked portion of many HDDs can be used for a mirror copy of the SSDs while the remaining portion of the HDDs may be used for storage of less frequently accessed data. The short stroked portion of the HDD corresponds to an outer diameter portion of the HDD, i.e. an outer track or set of tracks of the HDD that may be read/written by the read/write heads of the HDDs with minimal movement of the read/write head.

Thus, with the mechanisms of the illustrative embodiments, a storage system may be provided that includes SSDs to provide high performance access to critical or frequently accessed data while providing redundancy for these SSDs in a cost effective manner. That is, rather than having to include additional SSDs for purposes of providing redundancy, and thereby greatly increasing the cost of the storage system, the illustrative embodiments provide mechanisms by which less expensive HDDs may be used for providing a redundant mirrored copy of the data in the SSDs in such a way that does not impact the performance of the SSDs. The solution provided by the mechanisms of the illustrative embodiments leverages the fact that a storage system will typically include a large set of HDDs and a small portion of these HDDs may be reserved for a mirror copy of a higher performance storage device, e.g., SSDs, such that a smaller set of higher performance storage devices, e.g., SSDs, may be included as part of the storage system.

While the illustrative embodiments will be described in terms of SSDs and HDDs, it should be appreciated that the present invention is not limited to such. To the contrary, the illustrative embodiments may be used with any storage system in which a first set of storage devices has a relatively higher performance than a second set of storage devices in the storage system and the second set of storage devices is used to provide a mirror copy of data stored in the first set of higher performance storage devices.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
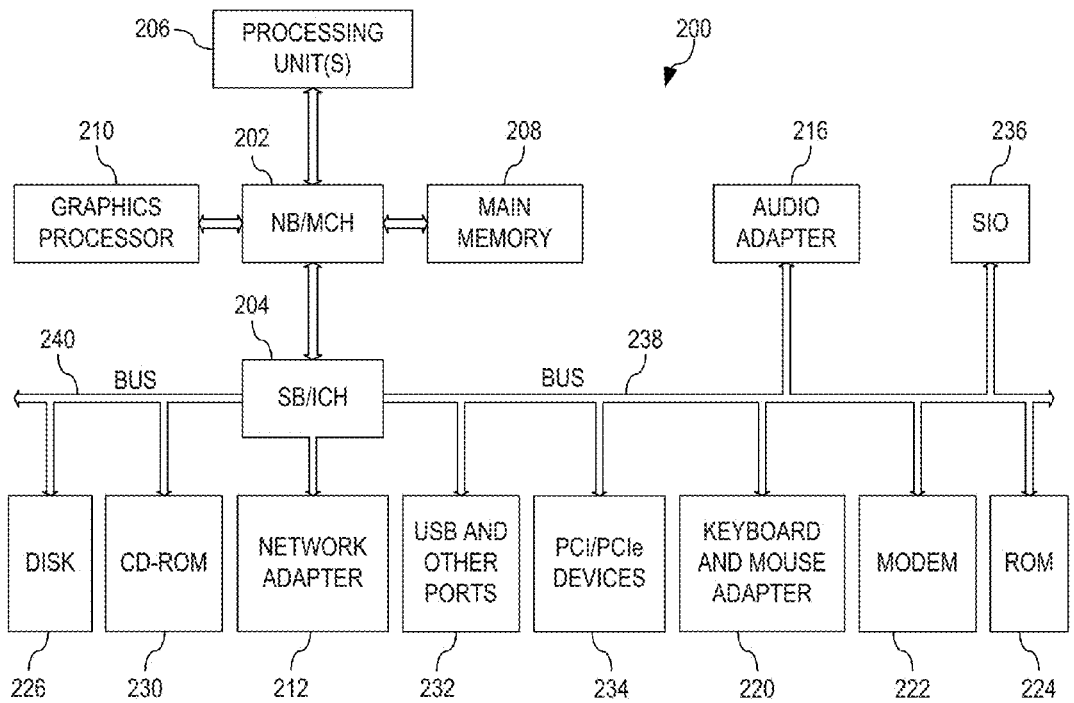
FIG. 2 is an example block diagram of a data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is an example diagram of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As mentioned above, the mechanisms of the illustrative embodiments provide a hybrid storage system in which one or more higher performance storage devices, e.g., solid state disks (SSDs) and a plurality of lower performance storage devices, e.g., hard disk drives (HDDs), are provided. The lower performance storage devices have a portion of these devices reserved for use as a mirrored copy of the higher performance storage devices. The remaining portions of the lower performance storage devices can be used for storing less frequently accessed data than the data stored in the higher performance storage devices. For purposes of the following description, it will be assumed that the higher performance storage devices are SSDs and the lower performance storage devices are HDDs, however the illustrative embodiments are not limited to these types of storage devices and other known or later developed storage devices may be used without departing from the spirit and scope of the illustrative embodiments.

This storage system may be implemented as a separate storage system, such as storage unit 108 in FIG. 1, accessible by one or more computing devices via one or more data networks, such as network 102. Alternatively, the storage system of the illustrative embodiments may be provided in association with one or more computing devices, e.g., one or more of servers 104 and 106. In one illustrative embodiment, both the SSDs and HDDs are associated with the same server computing device which provides a mechanism through which the SSDs and HDDs may be accessed by one or more other computing devices, e.g., client devices 110, 112, and 114. An example of one possible implementation of a storage system associated with a server computing device is provided in FIG. 2 where both SSDs and HDDs are provided in the server computing device. It should be appreciated that the server computing device may comprise multiple processors, storage controllers, and the like, depending upon the size of the storage system.

In another illustrative embodiment, the SSDs and HDDs may be provided in association with separate server computing devices coupled to one another via communication links, such as one or more data networks or the like. In such a case, the storage system may be distributed with regard to locality and may even be geographically distributed. Other implementations of the hybrid storage system of the illustrative embodiments using one or more computing devices may be used without departing from the spirit or scope of the illustrative embodiments.

Figure 3:
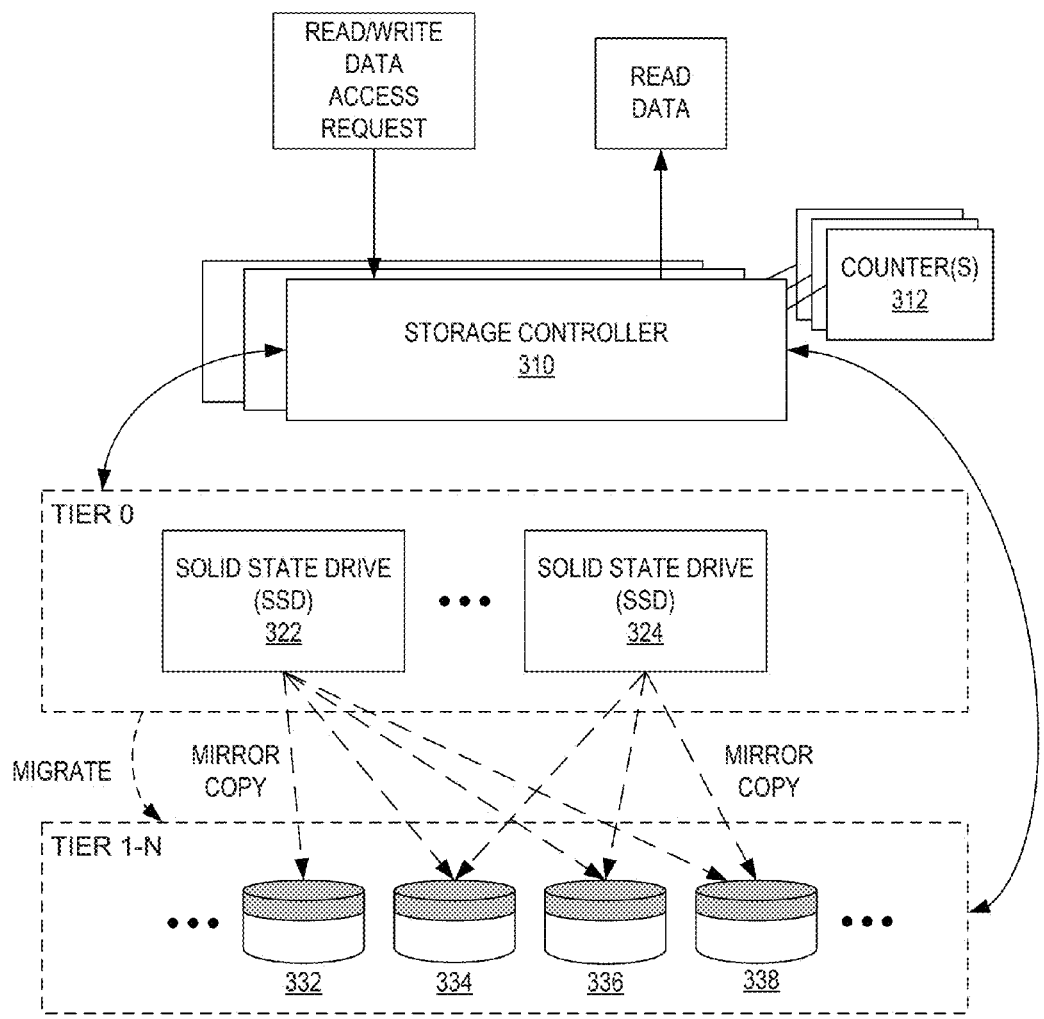
FIG. 3 is an example diagram of a storage system in accordance with one illustrative embodiment.

FIG. 3 is an example diagram of a storage system in accordance with one illustrative embodiment. As shown in FIG. 3, the storage system 300 comprises one or more storage system controllers 310, a first set of high performance storage devices 320 (which in the depicted example are SSDs), and a second set of relatively lower performance storage devices 330 (which in the depicted example are HDDs), both coupled to the one or more storage system controllers 310. Additional sets of storage devices may be provided without departing from the spirit and scope of the illustrative embodiments. Additionally, the storage controllers may have a storage cache (not shown) made from fast memory like DRAM that acts as a small but very fast tier.

The first set of high performance storage devices 320, hereafter referred to as the SSDs 320, is comprised of one or more SSDs 322, 324 with the total number of SSDs 322-324 being less than the number of HDDs 332-338 in the second set of lower performance storage devices. The one or more storage system controllers 310 receives input/output (I/O) operations targeting the storage system 300, controls the distribution of the I/O operations to the various storage devices in the storage system 300, monitors the accesses to the storage devices, handles exception conditions like failed HDDs, configures and initializes the various devices, and generally orchestrates the operation of the storage system. The SSDs 320 provide a set of high performance storage devices which may be used to store, for example, frequently accessed data. The HDDs 330 provide a set of lower performance storage devices for providing second and lower tier storage as well as providing a mirrored copy of the data in the SSDs 320 (illustrated by dashed lines) as described hereafter. The SSDs 320 and HDDs 330 may be directly or indirectly connected to the storage system controller(s) 310. Moreover, in the depicted example, the dashed line connections between elements represent logical connections that may be derived by connecting a set of HDDs to a set of SSDs with protocol expanders, for example, such as SAS expanders or the like.

The determination of what data is frequently accessed and what data is less frequently accessed may be performed by the one or more storage system controllers 310 in any suitable manner. For example, the one or more storage system controllers 310 may maintain metadata identifying which sets of data are most frequently accessed and thereby should be stored on the SSDs 320. This metadata may further identify the location of the data on the SSDs 320 and/or the HDDs 330. Counters 312 may be employed for portions of data and may be incremented according to accesses being performed on the data. These counters 312 may be used, either alone or along with predetermined thresholds, to identify which portions of data are frequently accessed and which portions of data are less frequently accessed. Of course other mechanisms may be employed with the illustrative embodiments, as may become readily apparent to those of ordinary skill in the art in view of the present description, for determining portions of data that are frequently accessed or less frequently accessed.

The SSDs 322, 324 may be any type of solid state disk devices known or later developed. For example, each SSD 322, 324 may be comprised of a plurality of flash memory devices, a flash controller and multiplexer, internal power supply and/or external power supply interface, buffer, and an input/output (I/O) interface, and the like. Of course other configurations of elements that constitute a SSD may be used without departing from the spirit and scope of the illustrative embodiments.

The HDDs 332-338 in the set of HDDs 330 may be any type of hard disk drive known or later developed. The HDDs 330 comprise a relatively much larger set of HDD storage devices 332-338 than the relatively much smaller set of SSDs 320. The HDDs 332-338 have a dual purpose of providing a lower tier or secondary storage for data that is less frequently accessed than the data stored in the SSDs 320. In the illustrative embodiments, the HDDs 332-338 in the set of HDDs 330 may be arranged using a reliability mechanism, such as using a RAID configuration or the like. The particular RAID level, or other reliability mechanism, utilized depends on the particular configuration. Any reliability mechanism may be used without departing from the spirit or scope of the present invention.

With the mechanisms of the illustrative embodiments, each of the HDDs 332-338 in the set of HDDs 330 has a portion of their storage space reserved for use as a storage location for a part of a mirrored copy of the data stored in the SSDs 322, 324 (this reserved portion is shown in FIG. 3 as a shaded portion of each of the HDDs 332-338). In one illustrative embodiment, this portion of the storage space of the HDDs 332-338 corresponds to the tracks at the outer diameter of the platters of the HDDs 332-338, i.e. the short stroked portion of the HDDs 332-338. In one illustrative embodiment, this corresponds to approximately 10 percent of the total storage capacity of the platters in the HDD 332-338. This portion of the HDDs 332-338 is reserved for the mirror copy of the SSDs 322, 324 because it can be accessed with the highest performance since there are less head switches due to the larger circumference in relation to the inner diameter of the platter. By aggregating the storage capacity of the reserved portions of the HDDs 332-338 and the access rates for accessing these reserved portions (which represent the highest access rates for the HDDs 332-338 since the outer diameter is accessed with minimal head switches), a performance of the HDDs 332-338 comparable to the SSDs 322, 324 may be achieved such that mirroring of data from the SSDs 322, 324 to the reserved portions of the HDDs 332-338 is made feasible.

To better understand the way in which the present invention operates, consider the following example. Assume that the storage system 300 is a tiered storage system in which tier 0 is comprised of high performance SSDs. In order to keep the cost of the storage system 300 as minimal as possible while providing the performance that is desired from the storage system, the number of SSDs is kept to a minimum. Thus, for example, the tier 0 set of SSDs 320, in this example, comprises two SSDs 322 and 324. These SSDs 322, 324, using technology available today, can perform approximately 20,000 read operations per second and 20,000 write operations per second.

In order for the outer diameter, or short stroked, portion of the set of HDDs 330 to be an effective mirror for the SSDs 320, three basic guidelines should be followed. First, enough HDDs should be chosen such that, in sum, their outer diameter or short stroked performance, measured in number of operations per second for example, approximates the performance that the SSDs can provide. Second, the aggregate capacity of the reserved portion of the HDDs should be equal to or greater than the total capacity of the SSDs, i.e. N*(0.1)*capacity=total capacity of SSDs, where N is the number of HDDs and 0.1 is a chosen percentage representing the reserved portion of each HDD for use as a mirrored copy of the SSDs. Third, the controllers for the HDDs and SSDs should not cause any additional bottlenecks.

Thus, taking these guidelines into consideration, and using the example mentioned above, a set of HDDs 330 for providing a mirrored copy of the SSDs 322, 324 needs to be chosen which can meet 40,000 operations per second (20,000 operations per second for each of the two SSDs 322, 324). Further it is assumed that the storage controller 310 controlling the SSDs 322, 324 can perform at least 40,000 ops per second.

If it is assumed that the SSDs have a storage capacity of 400 GB, then the outer diameter portions, or short stroked portions, of the HDDs 330 need to provide 800 GB of storage capacity, in the aggregate. If the HDDs 332-338 are 300 GB 10 KRPM 2.5 inch SAS drives, for example, then each HDD 332-338 has a reserved outer diameter portion of 30 GB each for use in providing a portion of a mirrored copy of the data stored in the SSDs 322, 324. This means that there needs to be a minimum of 27 HDDs 332-338 (800/30 rounded up) to provide sufficient storage capacity for a mirrored set of two SSDs 322, 324.

However, in order to provide a sufficiently high access rate that approximates that of the SSDs 322, 324, a larger set of HDDs 332-338 becomes necessary. When considering the number of operations per second, one takes the highest number of operations per second which can be achieved on the outer diameter, or short stroked, portion of the HDDs 332-338 which are being used in the storage system 300. In the above example, using current technology, this is approximately 300 operations per second. In order to achieve the 40,000 operations per second of the SSDs 322, 324 (20,000 operations per second per SSD), there must be at least 134 HDDs 322-324 provided (40,000/300=133.333).

However, as mentioned above, the HDDs 332-338 are preferably configured in a reliability configuration, such as a RAID configuration, which requires additional drives to provide such reliability. Using a RAID configuration as an example, 8 is a common RAID rank size for HDDs and thus, a system of 144 HDDs (18 ranks of 8 HDDs) would provide enough performance to form the mirrored relationship for the two SSDs 322, 324. However, since the reserved space is used as a redundant copy of data of the SSDs 322, 324, it is not necessary to use a redundancy technique on this set of data. In fact, including such a redundancy mechanism for the reserved space would further slow down the performance. Therefore, the data stored on all the HDDs 332-338 as a redundant copy of the SSDs 322, 324 may be striped across all the HDDs 332-338 in what is referred to as a RAID 0 pattern. The system also may use cheaper SSDs to provide a set of drives for storing the redundant copy which do not have as high a performance level as the ones noted. In this case, less HDDs 332-338 are required for the redundant copy.

Thus, for this example configuration, the storage system 300 would be comprised of two SSDs 322, 324 provided at tier 0 of the multi-tiered storage system 300 and at least 144 HDDs arranged as 18 ranks of 8 HDDs 332-338 in a RAID configuration at a tier 1 and/or lower tier of the storage system 300. A first portion of each HDD 332-338 is reserved for storing a portion of the mirrored copy of data from the SSDs 322, 324. A relatively larger second portion of the HDD 332-338 may be used as storage space for the second tier of less frequently used data.

Using this example configuration of the storage system 300, writes to the storage system 300 are striped across the SSDs 322, 324. In addition, the data is also striped across the reserved portions of the outer diameter, or short stroked portions, of the HDDs 332-338. The data is striped in such a way as to minimize disk hot spots. This is especially important should the need arise to ever use the HDD area to read the data in the event one SSD is not functioning properly or the SSDs achieve their maximum performance and the system determines it can satisfy read requests from HDDs with similar average latency. Example ways of doing this are to use wide striping of data across the HDDs 332-338 or striping the data across the ranks of HDDs, e.g., the 18 ranks of HDDs, and then having the data subsequently striped within the ranks of HDDs. That is, in the above example, a portion of the data may be allocated for storage by a particular rank of the 18 ranks of the HDDs and that portion may then be distributed or striped across the 8 HDDs within that rank.

While data may be initially striped across the SSDs 322, 324, this data may, at a later time, be determined by the controller 310 to be "colder" data, i.e. not frequently accessed any more, and thus, needs to be migrated to the HDDs 332-338. The controller 310, in such a case, may move the "colder" data from the SSDs 322, 324, to the long stroked portion of the HDDs 332-338, i.e. the portion not reserved for the mirror copy of data. This will use the critical SSD bandwidth. However, in an alternative, the controller 310 can migrate the copy of the "colder" data stored in the short stroked portion of the HDDs 332-338 to the pool of long stroked portions of the HDDs 332-338. The bandwidth on the HDDs 332-338 is close to that of the SSDs 322, 324 and thus, results in less of a performance degradation. The "colder" data on the SSDs 322, 324 may be overwritten after such migration.

For read operations, frequently accessed data is fetched from the SSDs 322, 324 since they provide a much higher data access rate. Data that is not stored in the SSDs 322, 324, is accessed from the non-reserved portions of the HDDs 332-338. During normal operation the unreserved portions of the HDDs 332-338, e.g., the 90 percent of each HDD 332-338 not reserved for use in providing the mirror copy of the SSDs 322, 324, is used for second tier storage. Since the more frequently accessed data is kept in the SSDs 322, 324, and a relatively large number of HDDs 332-338 are provided to backup the SSDs 322, 324, the performance demand on each individual HDD 332-338 is relatively small. Therefore, the bulk of the performance of the HDDs 332-338 is kept in reserve in case one of the SSDs 322, 324 fails or needs to be replaced.

In the event of a failure of one of the SSDs 322, 324, instead of reading the data from the failed SSD 322 or 324, the data is read from outer diameter or short stroked portion of the HDDs 332-338 that store the mirror copy of the data stored on the SSDs 322, 324. For write operations, the writes may be performed without redundancy until repair of the failed SSD 322 or 324 is completed. For example, writes may be striped across the HDDs 332-338 without writing to the SSDs 322, 324 and thus, a lower performance and lack of redundancy is experienced for a short time while the failed SSD 322 or 324 is repaired or replaced. The storage controller 310 can mitigate the write performance degradation by having a DRAM cache (not shown) for write coalescing. Given the large number of HDDs 332-338, read and write operations will be the same as before, but latency will increase. However, it should be appreciated that the relative unlikelihood of a failure of a SSD (since there are no moving parts and SSDs are not as susceptible to failures due to physical causes) coupled with the inexpensive mirror mechanisms of the illustrative embodiments and the optimized number of SSDs makes this a suitable solution for most storage system applications.

It is also expected that many storage systems may deploy a spare SSD in order to rebuild data in the event of a failure. This would certainly increase the cost but is analogous to what would happen in a RAID system. An alternate design would involve using three sets of SSDs, one set of one or more SSDs for the data, another set of one or more SSDs for parity data, and a third set of one or more SSDs for spare drives.

In an alternative embodiment, the data written to the HDDs 332-338 during a failure of a SSD 322 or 324 may be striped across the HDDs 332-338 in a manner as described above, with a second copy of the data being stored in the non-reserved portion of the HDDs 332-338. This second copy serves as a redundant copy or mirror for the data stored in the reserved portions of the HDDs 332-338.

In yet another alternative, a spare SSD (not shown) may be provided in the storage system 300. This spare SSD may be hot-swapped in to replace a failed SSD 322 or 324 when necessary. Of course, any combination of these mechanisms or other failure recovery mechanisms for handling a failure of a SSD may be used without departing from the spirit and scope of the illustrative embodiments.

As mentioned above, with the mechanisms of the illustrative embodiments, a portion of the HDDs is reserved for use in storing a portion of the mirrored copy of the data stored in the SSDs. The particular portion of the HDDs reserved for the mirrored copy may be dependent upon the particular implementation of the present invention. In one illustrative embodiment, the reserved portion of a HDD corresponds to approximately 10 percent of the total storage capacity of the HDD and is the outer diameter 10 percent, also known as the short stroked portion of the HDD.

Figure 4:
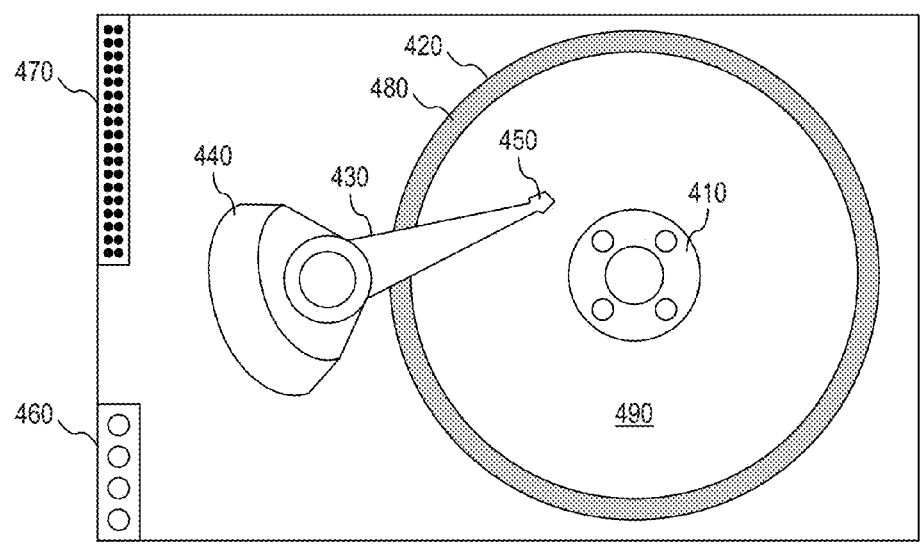
FIG. 4 is an example diagram of a hard disk drive platter with associated portions of the platter being shown to illustrate the way in which the hard disk drive platter is apportioned for mirror copy of solid state drives in accordance with one illustrative embodiment.

FIG. 4 is an example diagram of a hard disk drive platter with associated portions of the platter being shown to illustrate the way in which the hard disk drive platter is apportioned for mirror copy of solid state drives in accordance with one illustrative embodiment. As shown in FIG. 4, the HDD 400 comprises a spindle 410 that holds flat circular disks or platters 420 onto which data is recorded. The platters 420 are spun by the spindle 410 and associated actuator (not shown) at speeds that typically vary from 3,000 RPMs to 15,000 RPMs depending upon the particular HDD.

An actuator arm 430 and associated actuator 440 are provided for moving a read/write head 450 back and forth across the surface of the platters 420. There may be multiple actuator arms 430 and read/write heads 450, one for each platter 420 in the HDD 400. As the platter 420 rotates, the read/write head 450 detects and modifies the magnetization of the material immediately under the read/write head 450 to thereby read data from, or write data to, the platter 420 at the particular location immediately beneath the read/write head 450. The actuator 440 operates to move the actuator arm 430 which in turn moves the read/write head 450 on an arc across the platters 420 as they spin, thereby allowing the read/write head 450 to access almost the entire surface of the platter 420 as it spins. The HDD 400 connects to a power source via the power connector 460 and further connects to a host system via a data I/O connection 470.

As shown in FIG. 4, the outer diameter of the platters 420 is larger than the inner diameter of the platters 420 and thus, more data can be written to the outer diameter tracks (which are longer) than inner diameter tracks. That is, as one moves from the outer diameter of the platter 420 to the inner diameter of the platter 420, the tracks become smaller and thus, less data can be stored in each track as one goes toward the center of the platter 420. As a result of this, data being read/written from/to tracks at the outer diameter require fewer head switches, or movements of the read/write head 450, than data being read/written from/to tracks at the inner diameter. Since there is a delay associated with head switches, this means that data at the outer diameter of the platter 420 can be accessed at a higher rate than data at inner diameters of the platter 420.

In order to keep the number of HDDs used to provide a mirror copy of the data in the SSDs at a minimum, the illustrative embodiments utilize the portions of the HDDs that can be accessed at a highest rate, or best performance, which corresponds to the outer diameter, or short stroked portion, of the HDDs. The amount of storage capacity utilized at the outer diameter of the HDDs used for this mirror copy depends on the number of HDDs in the set of HDDs used and the storage capacity of the SSDs that is to be mirrored onto the set of HDDs. As mentioned above, in one illustrative embodiment, this reserved portion of the HDDs, i.e. portion 480 in FIG. 4, is approximately 10 percent of the total storage capacity of the platter 420. Thus, the "outer diameter" or short stroked portion 480 of the HDDs referred to herein is not strictly the outer most edge of the platter, but an area of the platters 420 of the HDD that extends from a first useable track of the platter 420 closest to the outer most edge of the platter 420 to a second useable track of the platter 420 that is closer to the inner diameter of the platter 420 with the area of the platter 420 falling between these two useable tracks constituting the reserved portion of the HDD used for storing a portion of the mirrored data from the SSDs.

The storage controller 310 has direct access to every physical sector in the SSDs and HDDs. Therefore, the controller 310 knows exactly what sectors to use to keep to the reserved portion, or outer diameter portion, of the HDDs 332-338. The controlling of 310 of what portions of the HDDs 332-338 is performed by the controller 310 based on address ranges, such as linear block address (LBA) ranges or the like. When a write of data is sent to the storage system, the storage system controller 310 maps the LBA address to the physical sectors on either the SSDs 322, 324 (for frequently accessed data) or the HDDs 332-338 (for less frequently accessed data). This mapping may include a definition of the reserved portion for the HDDs 332-338 such that the controller 310 has complete control over the storage data in these reserved portions of each of the HDDs 332-338.

The outer diameter or short stroked portion 480 requires a minimum number of head switches or movements of the read/write head in order to access the data stored in this portion 480 of the platter 420. The remaining portion 490 of the platters 420 may be used to store data as part of another tier of the multi-tiered storage system. While accesses to this remaining portion 490 of the platters 420 may cause a delay when accessing the reserved or short stroked portion 480 in some instances, by definition the accesses to the remaining portion 490 are infrequent and instances where such delay is caused should be minimal. The storage system controller may comprise logic that orders reads and writes such that accesses to data in the short stroked portion 480 of the platter 420 are grouped together and will not have to involve movement of the read/write head back and forth between the short stroked portion 480 and the remaining portion 490.

In one illustrative embodiment, as mentioned above, the reserved portion 480 corresponds approximately to 10 percent of the total storage capacity of the HDD platters 420. It should be appreciated that other implementations of the illustrative embodiments may make use or larger or smaller portions of each HDD, and these portions may or may not be located at the outer diameter, or short stroked portion, of the HDD. More economical implementations may allow less HDDs to serve as the mirrored pair knowing that there would be a performance degradation during an SSD failure. Since, SSD failures are rare, it may be acceptable to have some small performance degradation while being able to use less HDDs for the redundant copy. The short stroked portion or outer diameter is used in the illustrative embodiments so that fewer HDDs are needed to provide the same number of operations per second as is achieved by the SSDs. However, if the storage system has a larger number of HDDs available, other portions of the HDD may be used which provide a lower number of operations per second but which, in the aggregate with the other HDDs, may still approximate the number of operations per second achieved by the SSDs of the storage system.

Thus, the illustrative embodiments provide mechanisms for integrating high performance SSDs into a storage system in a cost effective manner. With the mechanisms of the illustrative embodiments a minimum number of SSDs required to provide a desired performance of a storage system may be provided at a first tier of the storage system. Lower performance HDDs may be provided in another tier of the storage system and may have a portion of their storage capacity reserved for use in storing a mirrored copy of the data stored in the SSDs. These HDDs provide redundancy and reliability for the relatively much smaller set of SSDs. The SSDs store critical or frequently accessed data while the non-reserved portions of the HDDs may store non-critical or relatively less frequently accessed data.

With the illustrative embodiments, it is not necessary to include redundant SSDs to provide reliability of the SSDs. To the contrary, the number of SSDs is minimized by the illustrative embodiments by eliminating the need to use additional SSDs for reliability and redundancy reasons and instead provides such reliability and redundancy using the HDDs already existing in the storage system. As a result, the cost of the storage system solution is minimized while providing a high performance storage system that utilizes SSDs.

Figure 5:
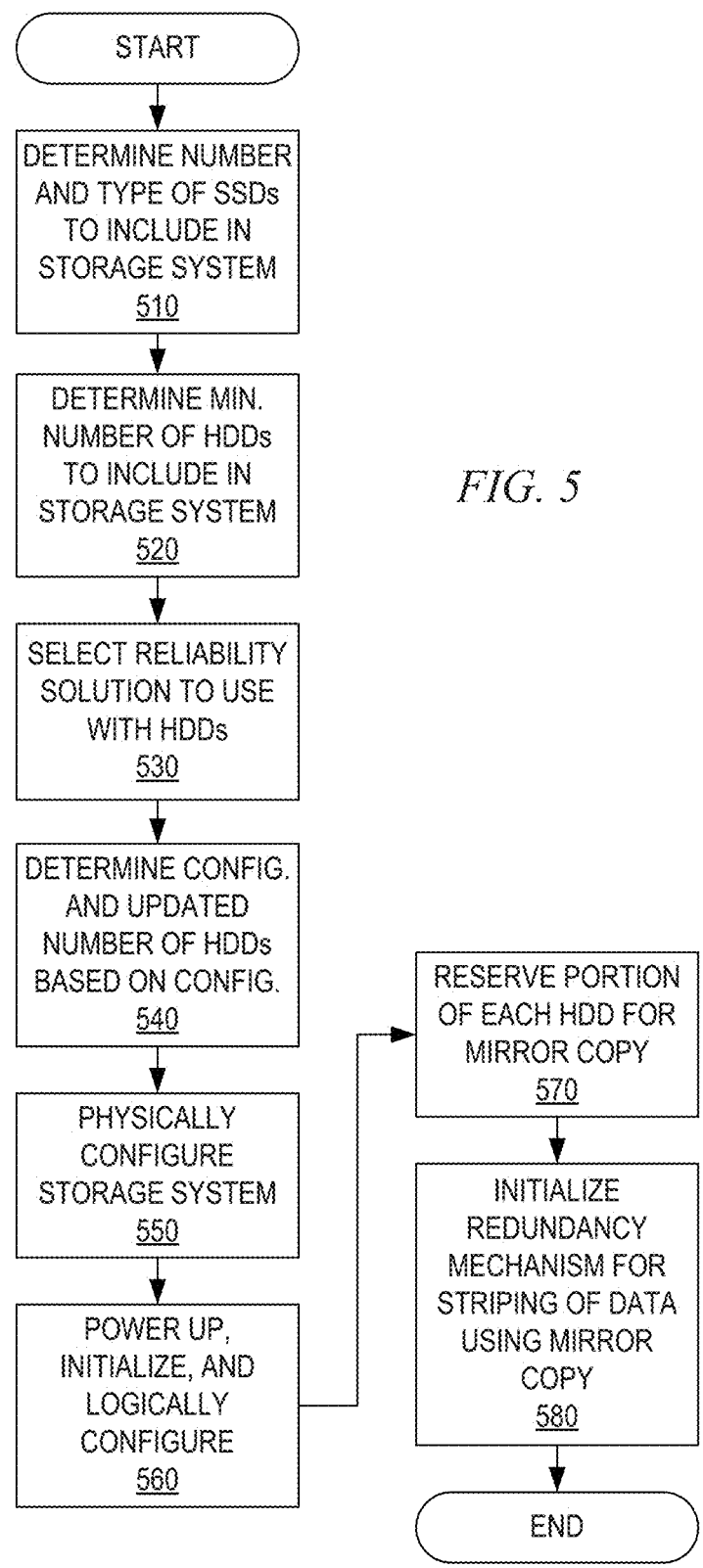
FIG. 5 is a flowchart outlining an example operation for configuring a storage system in accordance with one illustrative embodiment.

FIG. 5 is a flowchart outlining an example operation for configuring a storage system in accordance with one illustrative embodiment. As shown in FIG. 5, the operation starts by determining a number and type of SSDs to include the in storage system (step 510). Based on the number and type of SSDs to include in the storage system, a minimum number of HDDs required for providing a mirrored backup of the data in the SSDs is determined (step 520). As an example, similar to the example provided above, this determination may be made based on the access rate of the SSDs, e.g., aggregate number of operations per second, the highest access rate of the HDDs that would be used (this corresponds to the access rate for accessing the short stroked or outer diameter portion of the HDDs), and the like.

A reliability solution, e.g., RAID level or other reliability mechanism, is selected for the HDDs (step 530) and a configuration and updated number of HDDs to be included in the storage system is determined (step 540). For example, as in the example above, a rank of 8 HDDs may be selected and a certain number of ranks may be selected based on the minimum number of HDDs required as determined in step 520.

The storage system is then physically configured by coupling the storage devices together in an appropriate manner, providing one or more storage system controllers, and the like (step 550). The storage system is then powered up, initialized, and logically configured for use by one or more computing devices (step 560). This logical configuration includes reserving portions of the HDDs for use in storing a mirrored copy of the data in the SSDs (step 570) and initializing a redundancy mechanism for striping data across the SSDs, and also striping the data across the reserved portions of the HDDs as a mirrored copy (step 580). The operation then terminates.

Figure 6:
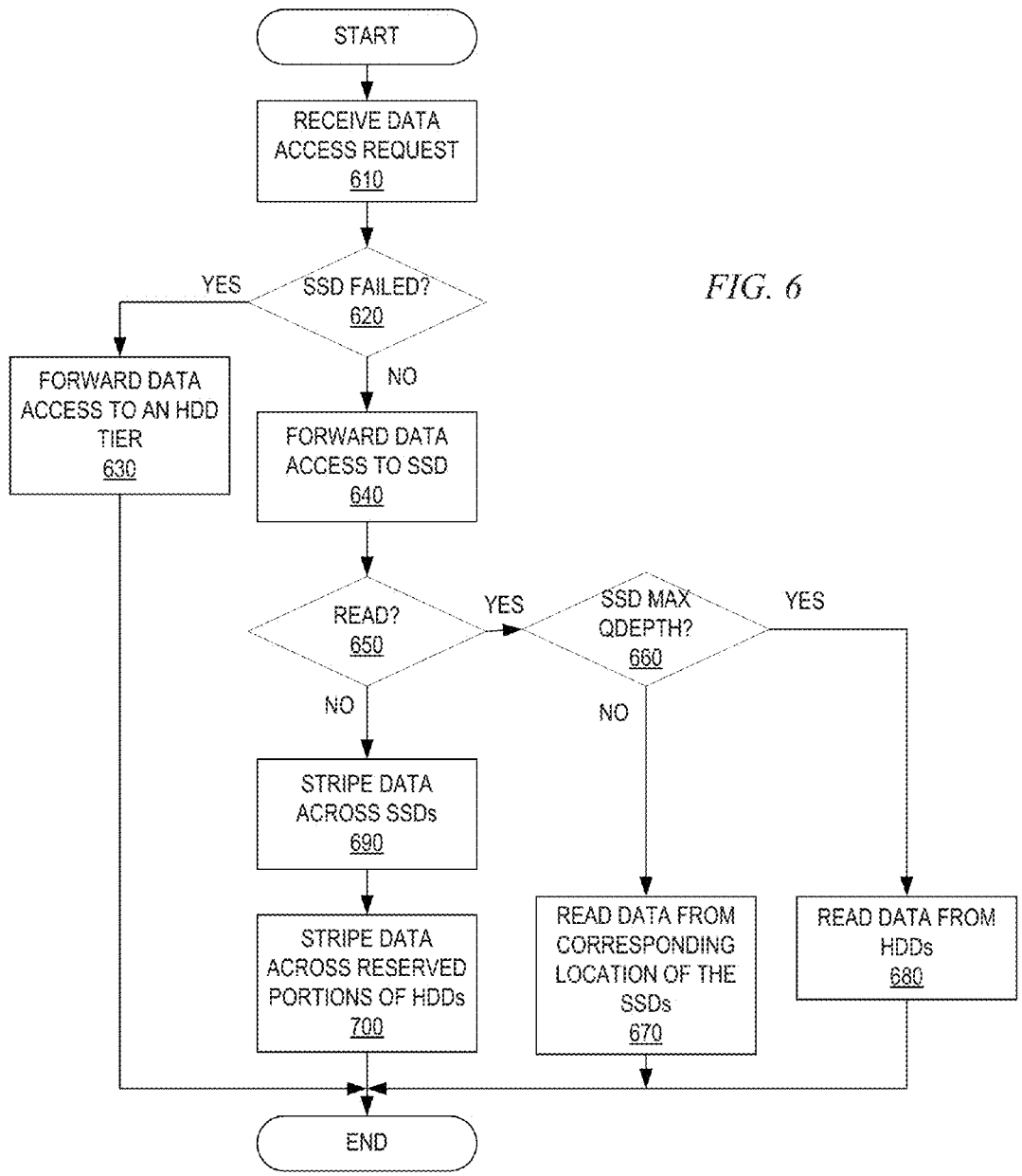
FIG. 6 is a flowchart outlining an example operation for handling data accesses in accordance with one illustrative embodiment.

FIG. 6 is a flowchart outlining an example operation for handling data accesses in accordance with one illustrative embodiment. As shown in FIG. 6, the operation starts by receiving a data access request in a storage system controller (step 610). A determination is made as to whether a SSD of the storage system has failed or not (step 620). If a SSD has failed, the data access request is forwarded to an HDD tier of the storage system for accessing the data referenced in the data access request (step 630). For example, if this data access is a read, then the corresponding data is read from the HDD tier. If the data access is a write, then the data is striped across the reserved portions of the HDD with an optional second copy being stored in the non-reserved portions of the HDDs.

If an SSD has not failed, then the data access request is sent to the SSDs of the storage system (step 640). A determination is made as to whether the data access is a read data access (step 650). If so, then a determination is made as to whether the SSDs queue depth is at a maximum (step 660). If the SSDs queue depth is at a maximum, then the data is read from the HDDs (step 670). If the SSDs queue depth is not at a maximum, then the data is read from a corresponding location of the SSDs (step 680). In other words, if the SSDs are at their maximum queue depth, then the average latency will become large and it becomes more efficient to utilize the HDDs to retrieve the required data.

If the data access is not a read, then it is a write data access and the data is striped across the SSDs (step 690). The write data is further striped across the reserved portions of the HDDs in the HDD tier of the storage system (step 700). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for storing data to a storage system comprising a set of one or more solid state storage devices and a set of non-solid state storage devices, comprising:
   receiving a request to write data to the storage system;
   writing the data to the set of one or more solid state storage devices in response to receiving the request; and
   writing a mirror copy of the data to the set of non-solid state storage devices in response to receiving the request, wherein the mirror copy of the data is written to short stroked portions of the non-solid state storage devices located at an outer diameter of physical disks of the non-solid state storage devices, and wherein the short stroked portions of each non-solid state storage devices is a portion of a total storage capacity of the non-solid state storage device that is less than the total storage capacity of the non-solid state storage device.

2. The method of claim 1, wherein the set of one or more solid state storage devices comprises a smaller number of solid state storage devices than a number of non-solid state storage devices in the set of non-solid state storage devices.

3. The method of claim 1, wherein the solid state storage devices are solid state drives and the non-solid state storage devices are hard disk drives.

4. The method of claim 1, wherein data written to the solid state storage devices is data that is determined to be frequently accessed, and wherein data stored in non-reserved portions of the non-solid state storage devices is data determined to be not frequently accessed.

5. The method of claim 4, further comprising:
   determining whether data stored in the reserved portions of the non-solid state storage devices is no longer frequently accessed; and
   migrating data stored in the reserved portions of the non-solid state storage devices that is determined to be no longer frequently accessed to the non-reserved portions of the non-solid state storage devices.

6. The method of claim 1, wherein writing the data to the set of one or more solid state storage devices comprises striping the data across the set of one or more solid state storage devices, and wherein writing the mirror copy of the data to the set of non-solid state storage devices comprises striping the data across reserved portions of each of the non-solid state storage devices in the set of non-solid state storage devices.

7. The method of claim 1, wherein the set of non-solid state storage devices are configured into ranks of non-solid state storage devices, and wherein striping the data across the reserved portions of each of the non-solid state storage devices comprises striping the data across the ranks of non-solid state storage devices such that each rank of the non-solid state storage devices comprises a portion of the data, and wherein the portion of data for a rank is striped across non-solid state storage devices within the rank.

8. The method of claim 1, wherein a number of non-solid state storage devices in the set of non-solid state storage devices is selected based on a sum of short stroked performance measurements of the non-solid state storage devices and an aggregate capacity of the reserved portions of the non-solid state storage devices.

9. The method of claim 1, wherein a number of non-solid state storage devices in the set of non-solid state storage devices is selected as a number of non-solid state storage devices that provides, in the aggregate, a number of operations per second that is approximately the same as the number of operations per second provided by the set of one or more solid state storage devices.

10. The method of claim 1, wherein the number of non-solid state storage devices in the set of non-solid state storage devices is selected according to a minimum number of non-solid state storage devices being determined based on an aggregate storage capacity of reserved portions of the non-solid state storage devices being equal to or larger than a storage capacity of the set of one or more solid state storage devices.

11. A computer program product comprising a computer readable storage medium having a computer readable program stored therein, wherein the computer readable program, when executed on a computing device, causes the computing device to:
   receive a request to write data to a storage system;
   write the data to a set of one or more solid state storage devices of the storage system in response to receiving the request; and
   write a mirror copy of the data to a set of non-solid state storage devices of the storage system in response to receiving the request, wherein the mirror copy of the data is written to short stroked portions of the non-solid state storage devices located at an outer diameter of physical disks of the non-solid state storage devices, and wherein the short stroked portions of each non-solid state storage devices is a portion of a total storage capacity of the non-solid state storage device that is less than the total storage capacity of the non-solid state storage device.

12. The computer program product of claim 11, wherein writing the data to the set of one or more solid state storage devices comprises striping the data across the set of one or more solid state storage devices, and wherein writing the mirror copy of the data to the set of non-solid state storage devices comprises striping the data across reserved portions of each of the non-solid state storage devices in the set of non-solid state storage devices.

13. The computer program product of claim 11, wherein data written to the solid state storage devices is data that is determined to be frequently accessed, data stored in non-reserved portions of the non-solid state storage devices is data determined to be not frequently accessed, and wherein the computer readable program further causes the computing device to:
  determine whether data stored in the reserved portions of the non-solid state storage devices is no longer frequently accessed; and
  migrate data stored in the reserved portions of the non-solid state storage devices that is determined to be no longer frequently accessed to the non-reserved portions of the non-solid state storage devices.

14. An apparatus, comprising:
  a processor; and
  a memory coupled to the processor, wherein the memory comprises instructions which, when executed by the processor, cause the processor to:
  receive a request to write data to a storage system;
  write the data to a set of one or more solid state storage devices of the storage system in response to receiving the request; and
  write a mirror copy of the data to a set of non-solid state storage devices of the storage system in response to receiving the request, wherein the mirror copy of the data is written to short stroked portions of the non-solid state storage devices located at an outer diameter of physical disks of the non-solid state storage devices, and wherein the short stroked portions of each non-solid state storage devices is a portion of a total storage capacity of the non-solid state storage device that is less than the total storage capacity of the non-solid state storage device.

15. The apparatus of claim 14, wherein the processor writes the data to the set of one or more solid state storage devices by striping the data across the set of one or more solid state storage devices, and wherein the processor writes the mirror copy of the data to the set of non-solid state storage devices by striping the data across reserved portions of each of the non-solid state storage devices in the set of non-solid state storage devices.

16. The apparatus of claim 14, wherein data written to the solid state storage devices is data that is determined to be frequently accessed, data stored in non-reserved portions of the non-solid state storage devices is data determined to be not frequently accessed, and wherein the instructions further cause the processor to:
  determine whether data stored in the reserved portions of the non-solid state storage devices is no longer frequently accessed; and
  migrate data stored in the reserved portions of the non-solid state storage devices that is determined to be no longer frequently accessed to the non-reserved portions of the non-solid state storage devices.

17. A system, comprising:
  a set of one or more solid state storage devices;
  a set of non-solid state storage devices; and
  a controller coupled to the set of one or more solid state storage devices and the set of non-solid state storage devices, wherein the controller is configured to:
  receive a request to write data to the storage system;
  write the data to the set of one or more solid state storage devices in response to receiving the request; and
  write a mirror copy of the data to the set of non-solid state storage devices in response to receiving the request, wherein the mirror copy of the data is written to short stroked portions of the non-solid state storage devices located at an outer diameter of physical disks of the non-solid state storage devices, and wherein the short stroked portions of each non-solid state storage devices is a portion of a total storage capacity of the non-solid state storage device that is less than the total storage capacity of the non-solid state storage device.

18. The system of claim 17, wherein data written to the solid state storage devices is data that is determined to be frequently accessed, and wherein data stored in non-reserved portions of the non-solid state storage devices is data determined to be not frequently accessed.

19. The system of claim 17, wherein writing the data to the set of one or more solid state storage devices comprises striping the data across the set of one or more solid state storage devices, and wherein writing the mirror copy of the data to the set of non-solid state storage devices comprises striping the data across reserved portions of each of the non-solid state storage devices in the set of non-solid state storage devices.

20. The system of claim 17, wherein the set of non-solid state storage devices are configured into ranks of non-solid state storage devices, and wherein striping the data across the reserved portions of each of the non-solid state storage devices comprises striping the data across the ranks of non-solid state storage devices such that each rank of the non-solid state storage devices comprises a portion of the data, and wherein the portion of data for a rank is striped across non-solid state storage devices within the rank.

21. The system of claim 17, wherein a number of non-solid state storage devices in the set of non-solid state storage devices is selected as a number of non-solid state storage devices that provides, in the aggregate, a number of operations per second that is approximately the same as the number of operations per second provided by the set of one or more solid state storage devices.

22. A method, in a data processing system, for storing data to a storage system comprising a set of one or more solid state storage devices and a set of non-solid state storage devices, comprising:
  receive a request to write data to the storage system;
  write the data to the set of one or more solid state storage devices of the storage system in response to receiving the request; and
  write a mirror copy of the data to the set of non-solid state storage devices of the storage system in response to receiving the request, wherein:
  the mirror copy of the data is written to reserved portions of each of the non-solid state storage devices,
  the reserved portion of each non-solid state storage device is a portion of a total storage capacity of the non-solid state storage device that is less than the total storage capacity of the non-solid state storage device, and
  a number of non-solid state storage devices in the set of non-solid state storage devices is selected based on a sum of short stroked performance measurements of the non-solid state storage devices and an aggregate capacity of the reserved portions of the non-solid state storage devices.

* * * * *